United States Patent
Burek et al.

(10) Patent No.: US 10,185,089 B2
(45) Date of Patent: Jan. 22, 2019

(54) SPLICING OPTICAL FIBER CABLE USING A MASS FUSION SPLICER HAVING A PITCH DIFFERENT FROM CABLE PITCH

(71) Applicant: OFS Fitel, LLC, Norcross, GA (US)

(72) Inventors: Denis E Burek, Cumming, GA (US); Yue Liang, Peachtree City, GA (US); Heng Ly, Stone Mountain, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/674,899

(22) Filed: Aug. 11, 2017

(65) Prior Publication Data

US 2018/0074261 A1 Mar. 15, 2018

Related U.S. Application Data

(60) Provisional application No. 62/482,329, filed on Apr. 6, 2017, provisional application No. 62/394,961, filed on Sep. 15, 2016.

(51) Int. Cl.
G02B 6/25 (2006.01)
G02B 6/44 (2006.01)
G02B 6/255 (2006.01)

(52) U.S. Cl.
CPC .......... *G02B 6/2553* (2013.01); *G02B 6/25* (2013.01); *G02B 6/4403* (2013.01); *G02B 6/4495* (2013.01)

(58) Field of Classification Search
None
See application file for complete search history.

(56) References Cited

U.S. PATENT DOCUMENTS

| | | | | | |
|---|---|---|---|---|---|
| 3,920,432 | A | * | 11/1975 | Smith | B29C 59/007 385/114 |
| 5,208,889 | A | * | 5/1993 | Cedrone | G02B 6/4403 385/106 |
| 5,754,725 | A | * | 5/1998 | Kuder | G02B 6/1221 385/143 |
| 6,442,318 | B1 | * | 8/2002 | Goldman | G02B 6/3833 385/114 |
| 6,498,882 | B1 | * | 12/2002 | Buckelew | G02B 6/3636 385/114 |
| 9,568,691 | B2 | * | 2/2017 | Hurley | G02B 6/4246 |
| 2015/0063766 | A1 | * | 3/2015 | Chen | G02B 6/2555 385/97 |

* cited by examiner

Primary Examiner — Ryan Lepisto
Assistant Examiner — Erin Chiem
(74) Attorney, Agent, or Firm — John M. Harman; Smith Tempel Blaha LLC

(57) ABSTRACT

A method for splicing a first optical fiber ribbon cable to a second optical fiber ribbon cable includes separating an end of the first optical fiber ribbon cable into loose optical fibers, and re-ribbonizing the loose optical fibers into a ribbonized end having a second pitch different from the first pitch of the original first optical fiber ribbon cable. The method further includes inserting the ribbonized end into a mass fusion splicer having the second pitch, and splicing the ribbonized end to the end of the second optical fiber ribbon cable using the mass fusion splicer.

10 Claims, 9 Drawing Sheets

SPLICING OPTICAL FIBER CABLE USING A MASS FUSION SPLICER HAVING A PITCH DIFFERENT FROM CABLE PITCH

CROSS-REFERENCE TO RELATED APPLICATIONS

The benefits of U.S. Provisional Patent Application No. 62/482,329, filed Apr. 6, 2017, entitled "200 μm FIBER RIBBON WITH 200 μm PITCH," and of U.S. Provisional Patent Application No. 62/394,961, entitled "200 μm TO 250 μm FIBER OPTIC RIBBON-TRANSIONAL FIBER HOLDER," filed Sep. 15, 2016, are hereby claimed, and the disclosures thereof incorporated herein in their entireties by this reference.

BACKGROUND

An optical fiber ribbon cable comprises two or more parallel optical fibers that are joined together along their lengths. A material commonly referred to as a matrix adheres the fibers together. In an "encapsulated" type of ribbon cable, the fibers may be fully encapsulated within the matrix material. The rigidity of encapsulated ribbon cables presents challenges to achieving high fiber packing density, e.g., within an outer cable jacket. So-called "rollable" ribbon cables have been developed that can achieve high fiber packing density. In a rollable ribbon cable the matrix material is intermittently distributed along the fibers, providing sufficiently flexibility to roll up the ribbon cable about an axis parallel to the fibers.

A common type of rollable optical fiber ribbon cable comprises optical fibers that are each 250 μm (micrometers or "microns") in diameter, spaced at a pitch (i.e., distance between the centers of adjacent fibers) of 250 μm. To increase fiber packing density without increasing cable size, 200 μm fiber having a bandwidth similar to the bandwidth offered by 250 μm diameter fiber has been developed.

A machine known as a mass fusion splicer can splice two ribbon cables without requiring an operator to separate the fibers. However, commercially available mass fusion splicers commonly have a fixed 250 μm pitch and cannot be used to splice ribbon cable having a 200 μm pitch.

It is possible to produce a rollable ribbon cable comprising 200 μm diameter fiber at a pitch of 200 μm. Such a ribbon cable thus has a 50 μm free space between each adjacent pair of optical fibers. To provide rollability, the matrix material is intermittently distributed along the fibers. Such distribution of matrix material allows an undesirable amount of lateral play or movement in the fibers, which may hamper aligning the ribbon cable in the 250 μm pitch grooves of the mass fusion splicer.

SUMMARY

Embodiments of the invention relate to splicing an optical fiber ribbon cable having a certain pitch using a mass fusion splicer having a different pitch.

An exemplary method for splicing a first optical fiber ribbon cable includes separating an end of the optical fiber ribbon cable into loose optical fibers, and then re-ribbonizing the loose optical fibers into a ribbonized end having a second pitch different from the first pitch of the original first optical fiber ribbon cable. The method further includes inserting the ribbonized end into a mass fusion splicer having the second pitch, and splicing the ribbonized end to an end of a second optical fiber ribbon cable using the mass fusion splicer.

Other systems, methods, features, and advantages will be or become apparent to one of skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
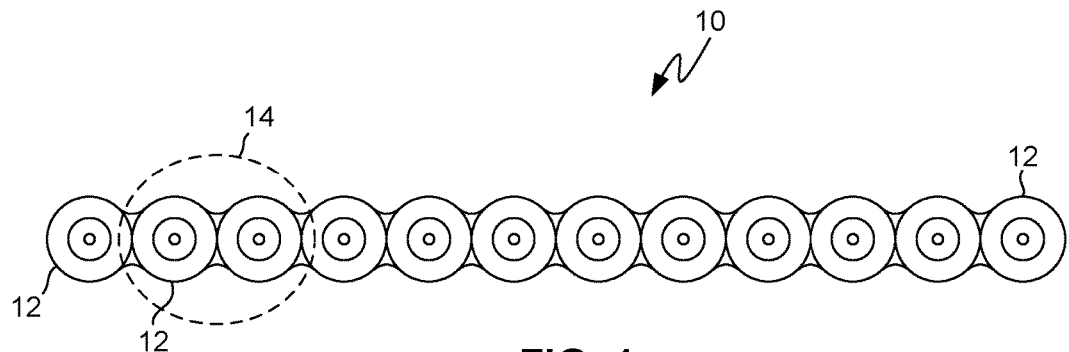
FIG. 1 is a cross-sectional view of a first optical fiber ribbon cable, in accordance with exemplary embodiments of the invention.
Figure 2:
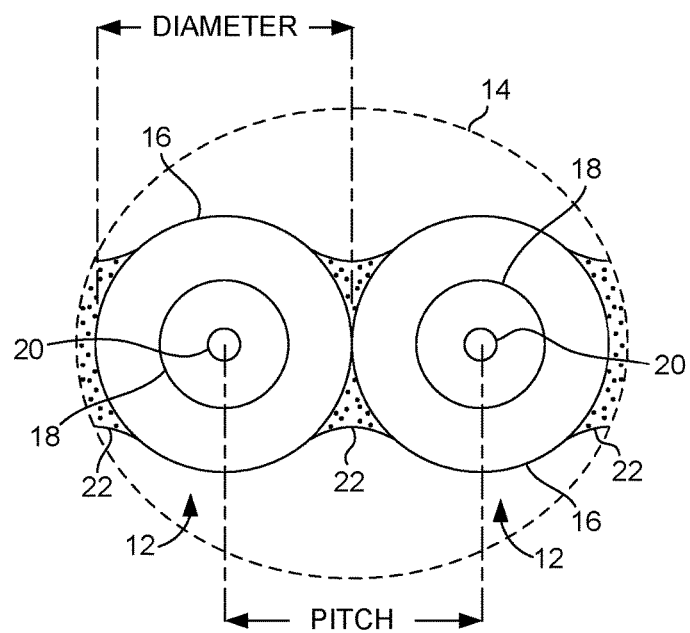
FIG. 2 is an enlargement of a portion of FIG. 1.

As illustrated in FIG. 1, in an illustrative or exemplary embodiment of the invention, a first optical fiber ribbon cable 10 includes a plurality of optical fibers 12, such as, for example, twelve (12) optical fibers 12. In other embodiments, such an optical fiber ribbon cable may have any number of such optical fibers. Common numbers of optical fibers in commercially available ribbon cable include 2, 4, 6, 8, 12, 24, 32, 36, and 48 optical fibers. As shown in the enlargement 14 (FIG. 2), the distance between the centers of each two adjacent optical fibers 12 defines a pitch. First optical fiber ribbon cable 10 may have a pitch of, for example, 200 µm. Each of optical fibers 12 has a diameter defined by its jacket 16. Each optical fiber 12 further includes a cladding 18 within jacket 16, and a core 20 within cladding 18. Each optical fiber 12 of first optical fiber ribbon cable 10 may have a diameter of, for example, 200 µm. As the structure of rollable optical fiber ribbon cables and methods for making rollable optical fiber ribbon cables are well understood in the art, such aspects of first optical fiber ribbon cable 10 are not described herein.

Matrix material 22 adheres pairs of adjacent optical fibers 12 together. To provide first optical fiber ribbon cable 10 with a rollable characteristic, matrix material 22 may not be disposed continuously along the entire length of first optical fiber ribbon cable 10, but rather may be intermittently distributed along the length, e.g., in patches, a pattern, etc.

Figure 3:
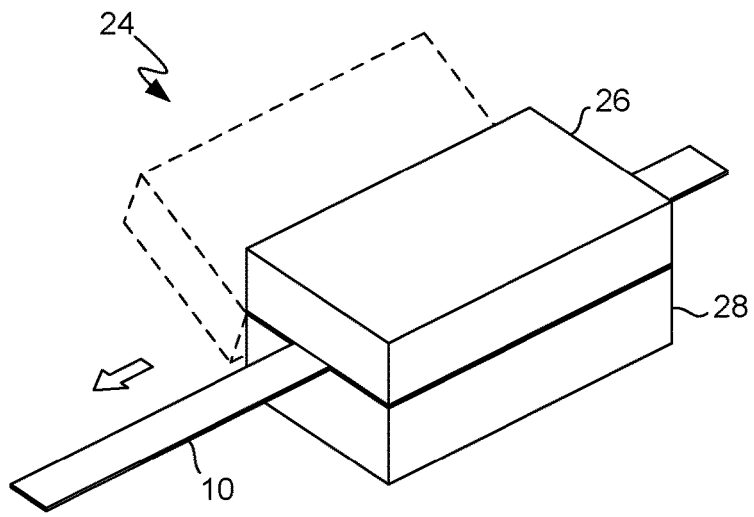
FIG. 3 illustrates the use of a de-ribbonizer to remove matrix material from an end of the first optical fiber ribbon cable of FIG. 1, in accordance with exemplary embodiments of the invention.
Figure 4A:
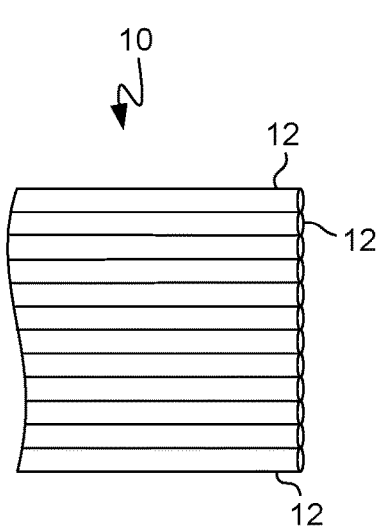
FIG. 4A is a top view of the end of the first optical fiber ribbon cable of FIG. 1, in accordance with exemplary embodiments of the invention.
Figure 4B:
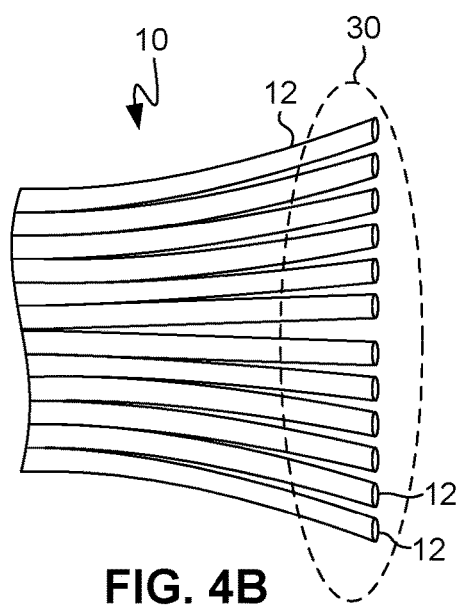
FIG. 4B is a top view of the end of the first optical fiber ribbon cable of FIG. 1 after it has been de-ribbonized into loose optical fibers, in accordance with exemplary embodiments of the invention.

As illustrated in FIG. 3, a conventional de-ribbonizer 24 may be used to separate or de-ribbonize the end of first optical fiber ribbon cable 10. To use de-ribbonizer 24, a hinged lid 26 is opened (the position shown in broken line in FIG. 3), and first optical fiber ribbon cable 10 is placed on the bottom or base 28 of de-ribbonizer 24. Lid 26 is then closed (the position shown in solid line in FIG. 3), and first optical fiber ribbon cable 10 is pulled by hand through de-ribbonizer 24 (as indicated by the arrow in FIG. 3). As first optical fiber ribbon cable 10 is pulled, blades (not shown) in de-ribbonizer 24 strip away matrix material 22 from the opposing sides of first optical fiber ribbon cable 10. In this manner, a sufficient amount of matrix material 22 (FIG. 2) is removed that the individual optical fibers 12 separate easily by hand into loose ends 30 (FIG. 4B).

Figure 5:
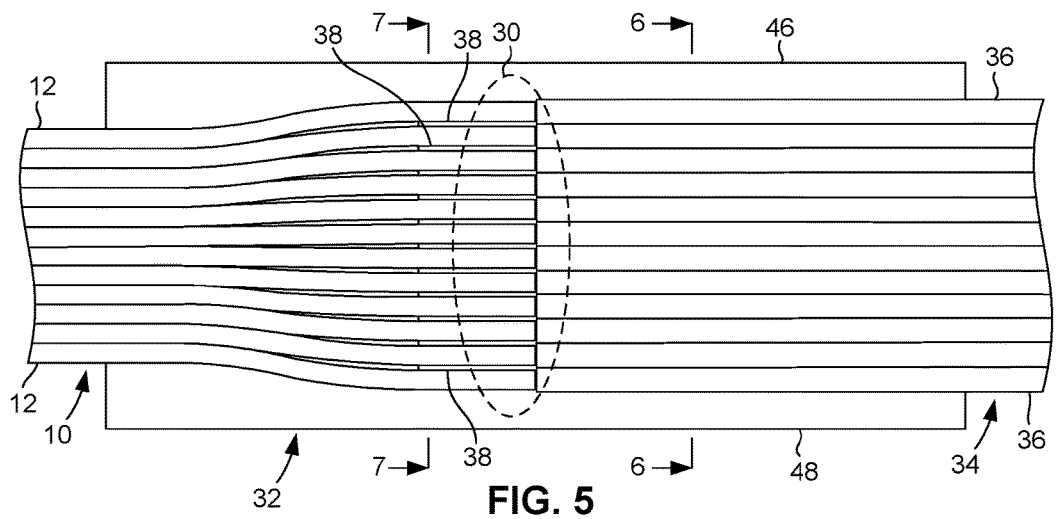
FIG. 5 illustrates using a fiber holder to ribbonize the loose optical fibers of FIG. 4B into a ribbonized end, and aligning the ribbonized end with an end of a second optical fiber ribbon cable, in accordance with exemplary embodiments of the invention.

As illustrated in FIG. 5, loose ends 30 are then placed in a first portion of a fiber holder 32. Fiber holder 32 may have a hinged lid and other features of conventional fiber holders, but such conventional features are not shown in FIGS. 5-7 for purposes of clarity.

Figure 6:
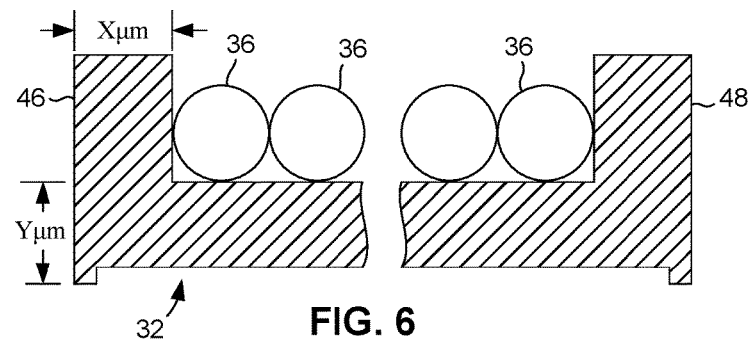
FIG. 6 is a sectional view of the fiber holder and the ribbonized end of the first optical fiber ribbon cable taken on line 6-6 of FIG. 5.

As illustrated in FIGS. 5 and 6, the end of a second optical fiber ribbon cable 34, comprising optical fibers 36, is placed in a second portion of fiber holder 32. In the illustrated embodiment, the number of optical fibers 36 in second optical fiber ribbon cable 34 is the same as the number of optical fibers 12 in first optical fiber ribbon cable 10. Due to the relative dimensions of fiber holder 32, the centers (cores) of the end faces of optical fibers 12 are aligned with the end faces of optical fibers 36. The retention of the ends of optical fibers 12 in fiber holder 32 in effect ribbonizes the loose ends 30. Fiber holder 32 may provide sufficient retention during splicing that no matrix material need be applied. As noted above, fiber holder 32 may have a lid (not shown) that, in the closed position, aids retention of optical fibers 12 and 36.

In the illustrated embodiment, each optical fiber 36 of second optical fiber ribbon cable 34 has a second diameter that is different from the diameter of each optical fiber 12. Each optical fiber 36 of optical fiber ribbon cable 34 may have a diameter of, for example, 200 µm. Second optical fiber ribbon cable 34 may have a pitch of, for example, 250 µm. Nevertheless, in other embodiments (not shown), such a second optical fiber ribbon cable may have another pitch. Similarly, in other embodiments, such a second optical fiber ribbon cable may comprise optical fibers of another diameter, such as, for example, 200 µm.

Figure 7:
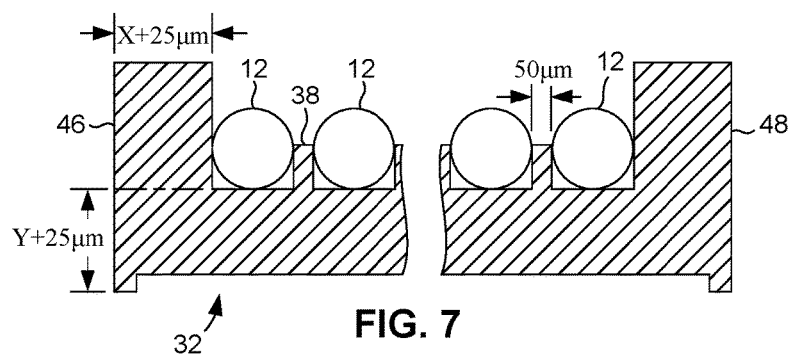
FIG. 7 is a sectional view of the fiber holder and the end of the second optical fiber ribbon cable taken on line 7-7 of FIG. 5.

As illustrated in FIG. 7, fiber holder 32 has spacers 38 that space the ends of adjacent optical fibers 12 apart. For example, in an embodiment in which second optical fiber ribbon cable 34 comprises 250 µm diameter optical fibers 36 at a pitch of 250 µm, and first optical fiber ribbon cable 10 comprises 250 µm diameter optical fibers 12, each spacer 38 has a width of 50 µm to promote alignment of the cleaved end faces of optical fibers 12 with the cleaved end faces of optical fibers 36.

Figure 8:
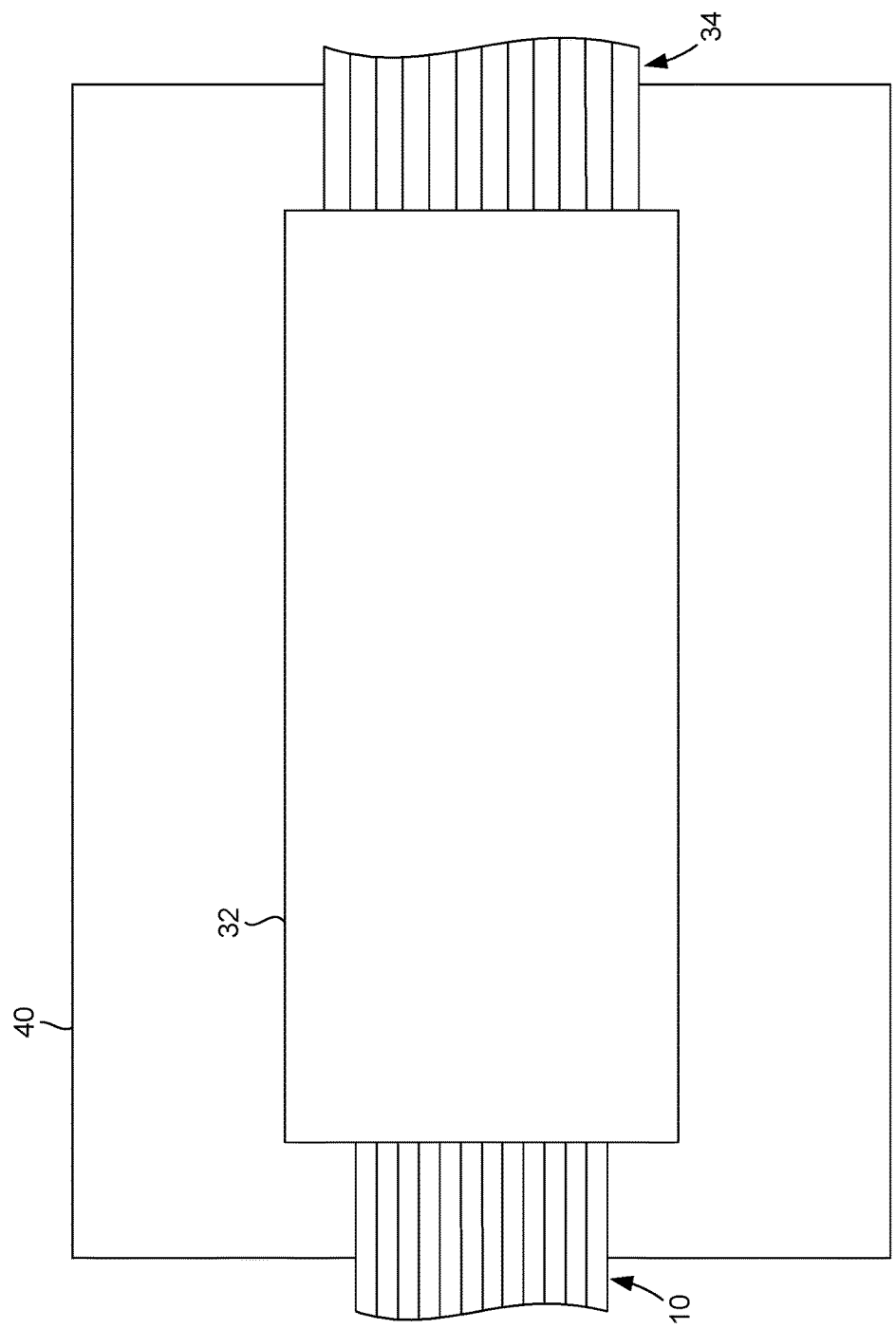
FIG. 8 illustrates using a mass fusion splicer and fiber holder to splice the ribbonized end of the first optical fiber ribbon cable to the end of the second ribbon cable, in accordance with exemplary embodiments of the invention.

Fiber holder 32, holding the aligned ends of first and second optical fiber ribbon cables 10 and 34, is then placed in a conventional mass fusion splicer 40, which is shown in FIG. 8 in a conceptual manner for purposes of clarity. Mass fusion splicer 40 has the same pitch as the ribbonized ends retained in fiber holder 32. For example, in the illustrated embodiment, mass fusion splicer 40 has a pitch of 250 µm. That is, mass fusion splicer 40 is configured to splice the ends of two ribbon cables, each having a pitch of 250 µm.

Fiber holder 32 is configured to be received within a corresponding receptacle (not separately shown) in mass fusion splicer 40 in a conventional manner. Thus, for example, the length, width and height of fiber holder 32 conform to corresponding dimensions of the receptacle in mass fusion splicer 40. Note that the width of fiber holder 32 at the cross section shown in FIG. 6 includes the width of the channel in which the ends of first and second optical fiber ribbon cables 10 and 34 are retained plus the width of the two side walls 46 and 48. In the illustrated embodiment, each of side walls 46 and 48 has a width of X µm at the cross section shown in FIG. 6, and a width of X+25 µm at the cross section shown in FIG. 7 (where X may be any number). Similarly, the height above the bottom of fiber holder 32 at which first and second optical fiber ribbon cables 10 and 34 are supported in the channel is Y µm at the cross section shown in FIG. 6 and Y+25 µm at the cross section shown in FIG. 7 (where Y may be any number). The bottom of fiber holder 32 rests on a surface (not separately shown) in the receptacle in mass fusion splicer 40. In this manner, the cleaved end faces of optical fibers 12 are held in alignment with the corresponding cleaved end faces of optical fibers 36 during splicing.

With the ends of optical fibers 12 and 36 retained in fiber holder 32 in mass fusion splicer 40, mass fusion splicer 40 may be operated in a conventional manner to clean, cleave and splice the ends of optical fibers 12 to the ends of optical fibers 36. As the operation of a conventional mass fusion splicer 40 is well understood by one of ordinary skill in the art, a detailed description of this aspect is not provided herein.

Figure 9:
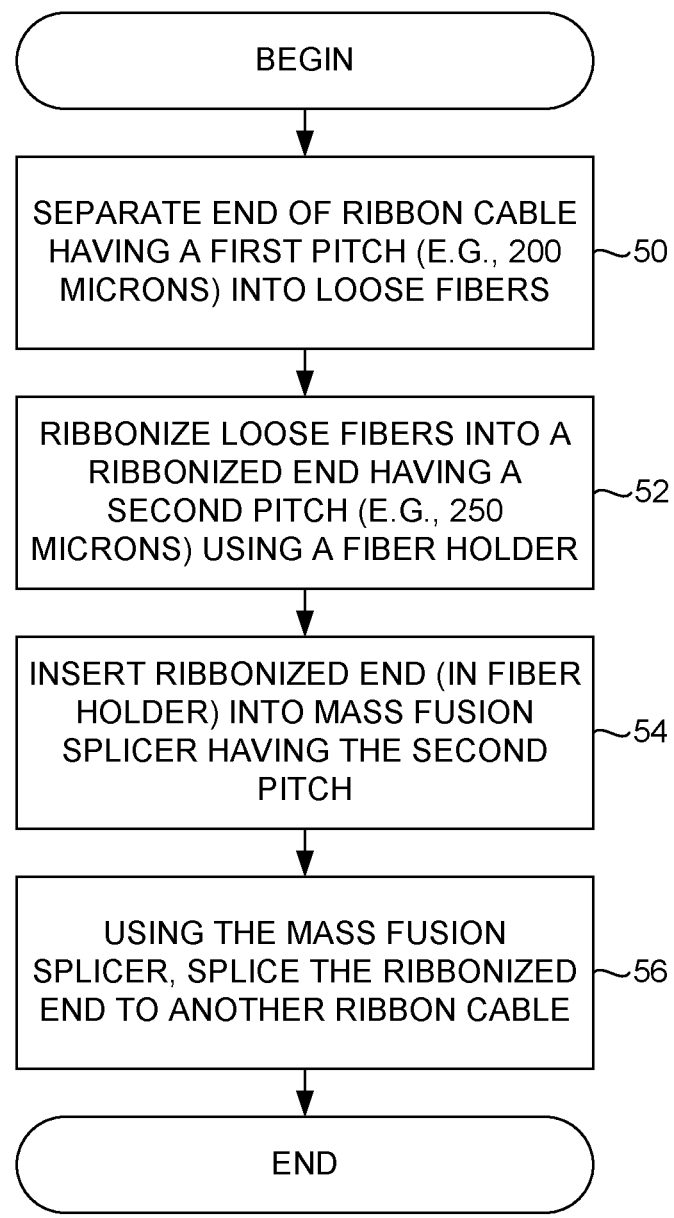
FIG. 9 is a flow diagram illustrating a method for splicing optical fiber ribbon cables, in accordance with exemplary embodiments of the invention.

The flow diagram of FIG. 9 further illustrates an exemplary method for splicing a first optical fiber ribbon cable to a second optical fiber ribbon cable. The first optical fiber ribbon cable has a pitch that may be referred to as the "first pitch." As indicated by block 50, the method may include separating an end of the first optical fiber ribbon cable into a plurality of loose optical fibers. A de-ribbonizer may be used. As indicated by block 52, the loose optical fibers are then re-ribbonized into a ribbonized end. The ribbonized end then may be cleaved in a conventional manner. The pitch of the ribbonized end, which may be referred to as the "second pitch," is different from the first pitch. A fiber holder may be used to re-ribbonize the loose optical fibers into a ribbonized end. As indicated by block 54, the ribbonized end, which may be retained in the fiber holder, is inserted into a mass fusion splicer. The end of a second ribbon cable is also inserted into the mass fusion splicer, and may also be retained in the fiber holder. The end of the second ribbon cable may be cleaved in a conventional manner before it is placed in the fiber holder. The pitch of the mass fusion splicer matches the pitch of the ribbonized end of the first optical fiber ribbon cable. That is, the mass fusion splicer has the second pitch. It can be appreciated that ribbonizing the loose optical fibers into a ribbonized end having the second pitch enables the use of a conventional mass fusion splicer having the second pitch. As indicated by block 56, the mass fusion splicer is then used in a conventional manner to splice the re-ribbonized end of the first optical fiber ribbon cable to the end of the second optical fiber ribbon cable.

Figure 10:
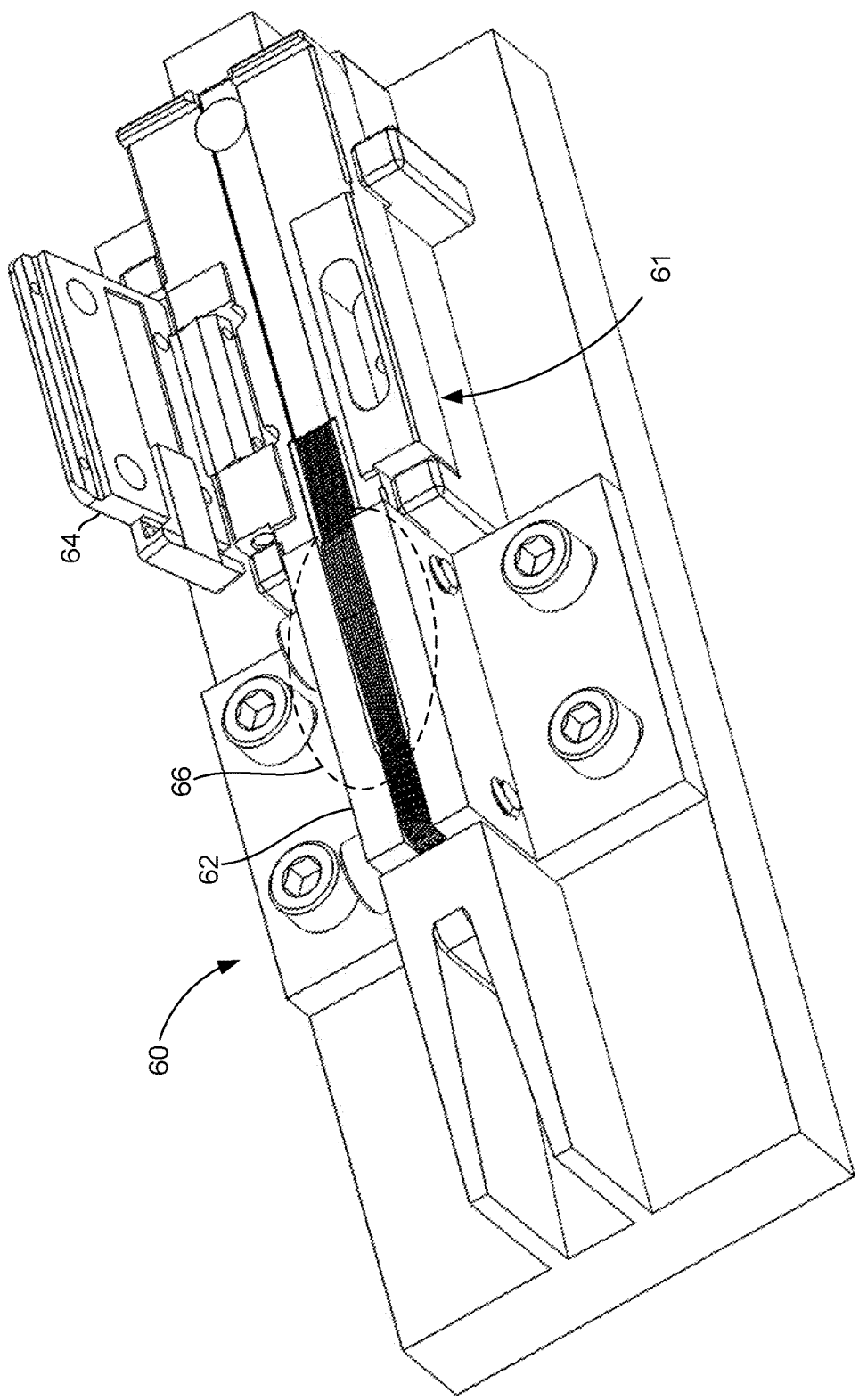
FIG. 10 is a perspective view of another fiber holder and a ribbon cable assembly fixture.
Figure 12A:
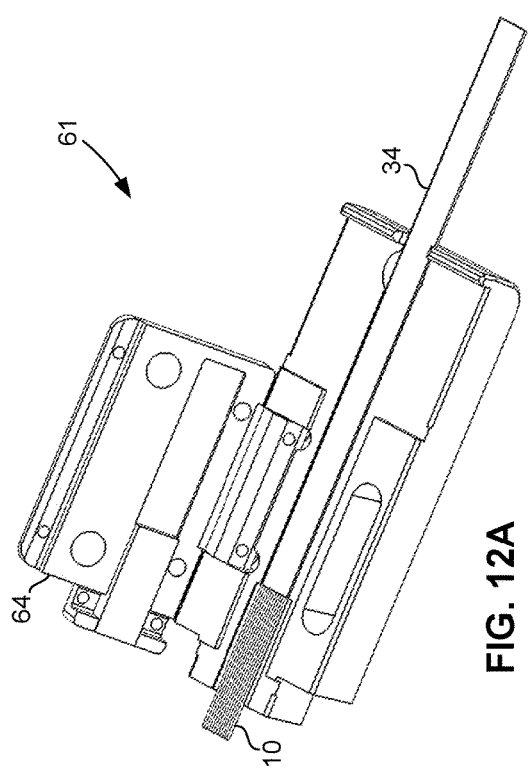
FIG. 12A is a perspective view of the fiber holder of FIG. 10, showing fibers in place and the lid in an open position.

As illustrated in FIG. 10, a ribbon cable assembly fixture 60 and a fiber holder 61 may be used together in a splicing method. Fiber holder 61, or fiber holder 61 in combination with ribbon cable assembly fixture 60, may be an example of above-described fiber holder 32 (FIGS. 5-7). Accordingly, ribbon cable assembly fixture 60 includes a fiber-receiving portion 62 that is similar to the portion shown in FIG. 5. Fiber holder 61 includes a hinged clamp or lid 64. As illustrated in FIG. 12A, lid 64 of fiber holder 61 may be opened to receive the re-ribbonized end of first optical fiber ribbon cable 10 and the end of second optical fiber ribbon cable 34 (FIG. 5). Although only one lid 64 is shown for purposes of clarity, in other embodiments such a fiber holder may have two lids, one of which can be closed to clamp the re-ribbonized end of first optical fiber ribbon cable 10, and the other of which can be closed clamp an end of second optical fiber ribbon cable 34.

Figure 11:
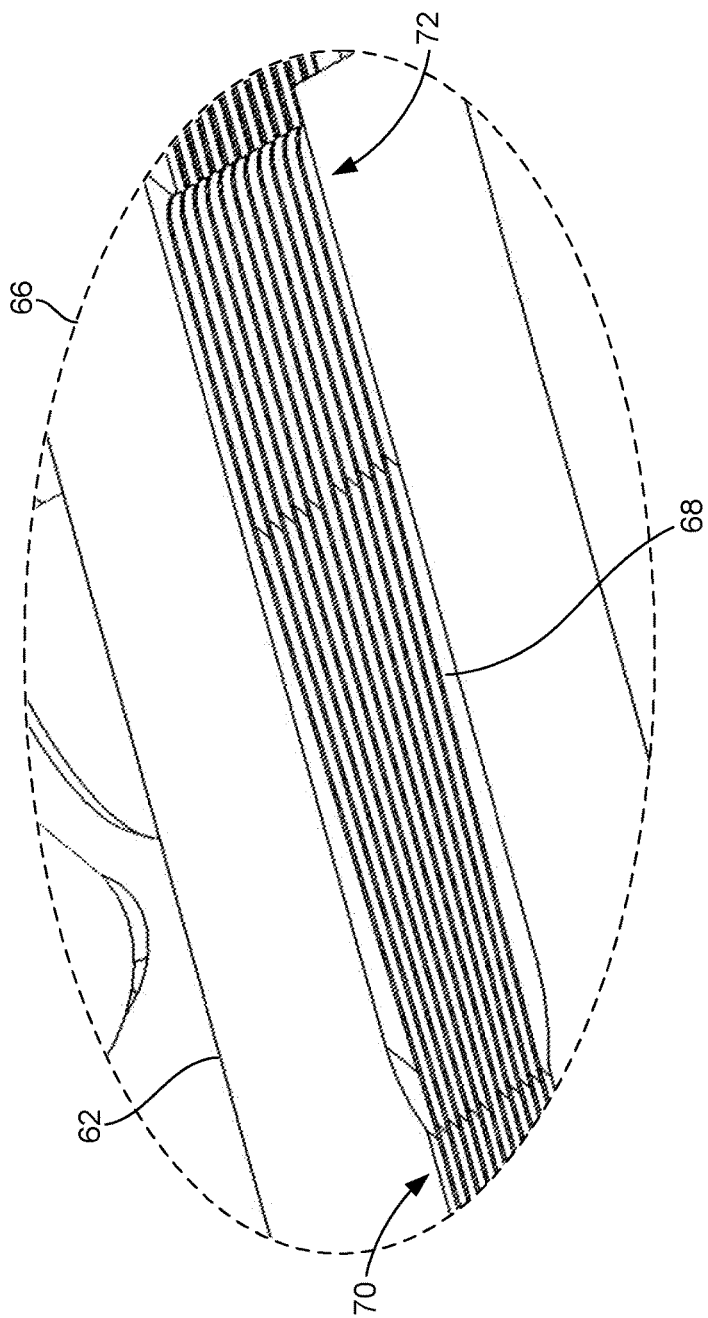
FIG. 11 is an enlargement of a portion of FIG. 10.

A region 66 of FIG. 10 is shown enlarged in FIG. 11. As shown in FIG. 11, fiber-receiving portion 62 includes a comb structure 68. Comb structure 68 may comprise planar sheets or strips retained in the body of fiber-receiving portion 62. At a first end 70 of fiber-receiving portion 62, the sheets or strips are parallel to each other. Likewise, at a second end 72 of fiber-receiving portion 62, the sheets or strips are parallel to each other. The space or channel between each pair of adjacent sheets or strips can retain an optical fiber. At first end 70, the channels are separated from each other at intervals corresponding to the first pitch (e.g., 200 µm). At second end 72, the channels are separated from each other at intervals corresponding to the second pitch (e.g., 250 µm). Between the first and second ends 70 and 72, the pitch gradually transitions between the first and second pitches.

Figure 12B:
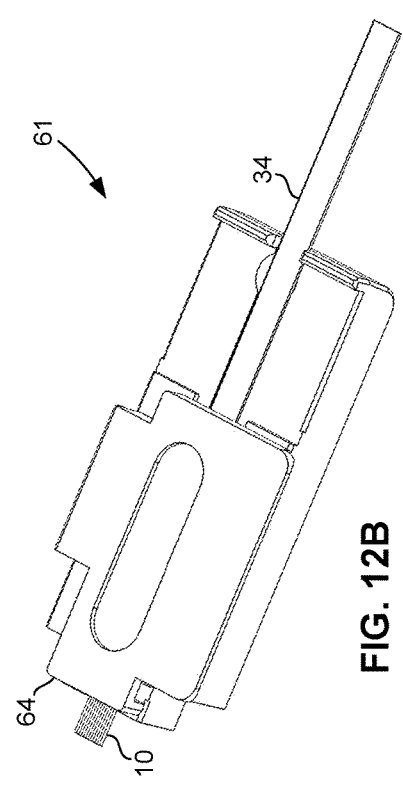
FIG. 12B is a perspective view of the fiber holder of FIG. 10, showing fibers in place and the lid in a closed position.
Figure 13:
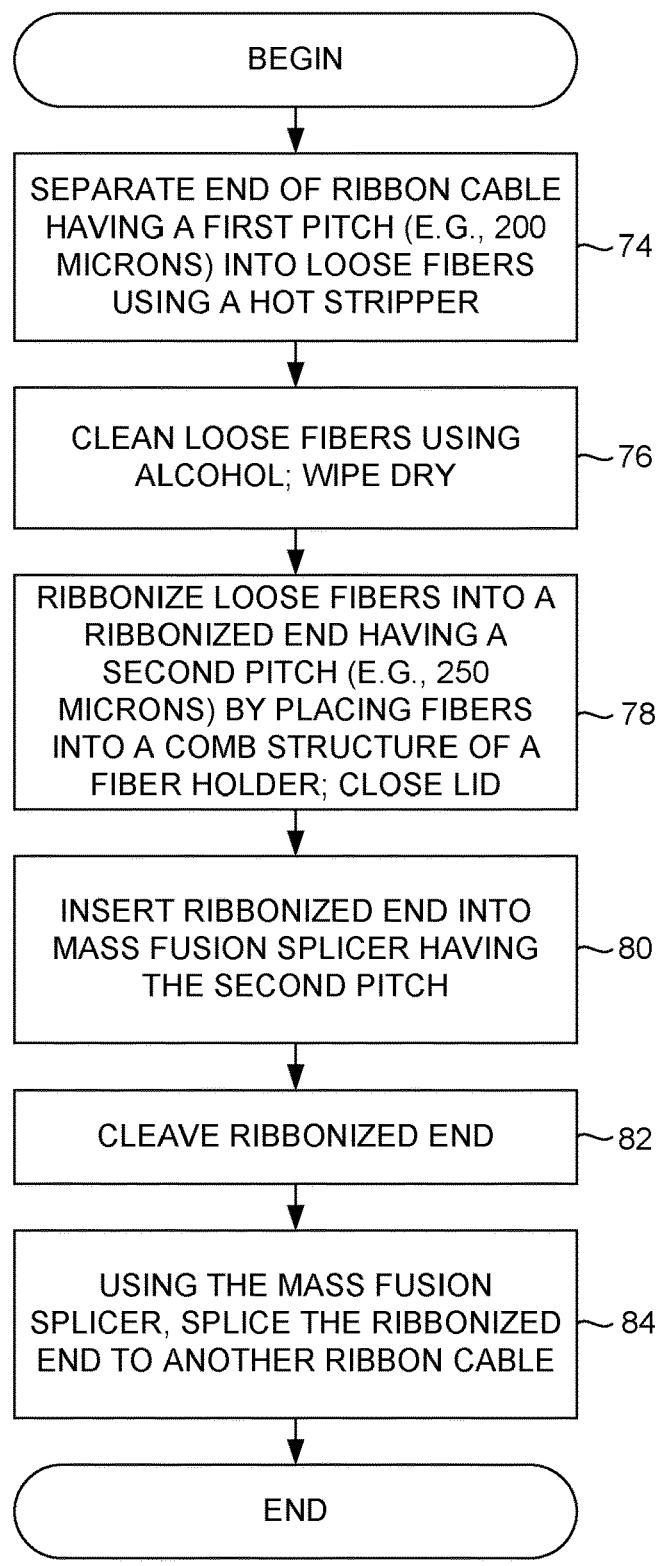
FIG. 13 is a flow diagram illustrating a method for splicing optical fiber ribbon cables using the fiber holder of FIGS. 10-12B, in accordance with exemplary embodiments of the invention.

As illustrated in FIG. 13, ribbon cable assembly fixture 60 and fiber holder 60 may be used in a method similar to that described above with regard to FIGS. 3-9. As indicated by block 74, the method may include separating an end of first optical fiber ribbon cable 10 having a first pitch, such as 200 µm, into a plurality of loose optical fibers by stripping the end of the first optical fiber ribbon cable using a hot stripper (not shown) or similar de-ribbonizer. As indicated by block 76, the loose optical fibers then may be cleaned using alcohol or a similar cleaning agent, and wiped dry. As indicated by block 78, the loose optical fibers are then re-ribbonized into a ribbonized end having a second pitch, such as 250 µm, by placing the plurality of loose optical fibers into comb structure 68 of ribbon cable assembly fixture 60 (FIG. 11). As described above with regard to FIG. 11, each fiber may be placed within one of the channels between two adjacent sheets or strips of comb structure 68. The re-ribbonized end of first optical fiber ribbon cable 10 extends into fiber holder 61 (FIG. 12A). The end of second optical fiber ribbon cable 34, which has a second pitch, such as 250 µm, may also be placed in fiber holder 61. Fiber holder 61 holds the ends of first and second optical fiber ribbon cables 10 and 34 in alignment with each other. Lid 64 of fiber holder 61 then may be closed (FIG. 12B) to clamp the ends of first and second optical fiber ribbon cables 10 and 34 in place, i.e., in alignment with each other. Fiber holder 61 then may be removed from ribbon cable assembly fixture 60.

As indicated by block 80, fiber holder 61, in which the re-ribbonized end of first optical fiber ribbon cable 10 and the end of the second optical fiber ribbon cable 34 are retained, is inserted into a conventional mass fusion splicer of a type configured to splice two optical fiber ribbon cables of the second pitch. As indicated by block 82, the mass fusion splicer is then used in a conventional manner to clean and cleave the ribbonized end of the first optical fiber ribbon cable and the end of the second optical fiber ribbon cable. As indicated by block 84, the mass fusion splicer is then further used in a conventional manner to splice the ribbonized end of the first optical fiber ribbon cable to the end of the second optical fiber ribbon cable.

One or more illustrative or exemplary embodiments of the invention have been described above. In accordance with the exemplary embodiments, compactness and tensile strength are achieved by a combination of compact yet strong optical fibers and a relatively small amount of reinforcing yarn. However, it is to be understood that the invention is defined by the appended claims and is not limited to the specific embodiments described.

What is claimed is:

1. A method for splicing a first optical fiber ribbon cable, comprising:
    separating an end of the first optical fiber ribbon cable into a plurality of loose optical fibers, the first optical fiber ribbon cable having a first pitch;
    inserting a portion of the first optical fiber ribbon cable having the first pitch and the plurality of loose optical fibers into a fiber holder, wherein the portion of the first optical fiber ribbon cable is received in a first portion of the fixture having the first pitch, and the plurality of loose optical fibers are received in a second portion of the fixture having a second pitch;
    ribbonizing the plurality of loose optical fibers into a ribbonized end having the second pitch;
    inserting the ribbonized end into a mass fusion splicer having the second pitch; and
    splicing the ribbonized end to an end of a second optical fiber ribbon cable using the mass fusion splicer.

2. The method of claim 1, wherein:
    ribbonizing the plurality of loose optical fibers comprises placing the plurality of loose optical fibers into a fiber holder having the second pitch; and
    inserting the ribbonized end into the mass fusion splicer comprises inserting the fiber holder into the mass fusion splicer.

3. The method of claim 1, wherein the first optical fiber ribbon cable is a rollable cable having matrix material distributed intermittently along the first optical fiber ribbon cable.

4. The method of claim 3, wherein the first optical fiber ribbon cable comprises a plurality of 200 micrometer diameter optical fibers, the first pitch is 200 micrometers, and the second pitch is 250 micrometers.

5. The method of claim 4, wherein the second optical fiber ribbon cable comprises a plurality of 200 micrometer diameter optical fibers at a second pitch of 250 micrometers.

6. The method of claim 4, wherein the second optical fiber ribbon cable comprises a plurality of 250 micrometer diameter optical fibers at pitch of 250 micrometers.

7. The method of claim 6, wherein:
ribbonizing the plurality of loose optical fibers comprises placing the plurality of loose optical fibers into a first portion of a fiber holder having a pitch of 250 micrometers, and placing the plurality of 250 micrometer diameter optical fibers of the second optical fiber ribbon cable into a second portion of the fiber holder having a pitch of 250 micrometers; and
inserting the ribbonized end into the mass fusion splicer comprises inserting the fiber holder into the mass fusion splicer.

8. A method for splicing a first optical fiber ribbon cable, comprising:
separating an end of the first optical fiber ribbon cable into a plurality of loose optical fibers by stripping the end of the first optical fiber ribbon cable using a hot stripper, the first optical fiber ribbon cable having a first pitch;
cleaning the plurality of loose optical fibers;
inserting a portion of the first optical fiber ribbon cable having the first pitch and the plurality of loose optical fibers into a fiber holder, wherein the portion of the first optical fiber ribbon cable is received in a first portion of the fixture having the first pitch, and the plurality of loose optical fibers are received in a second portion of the fixture having a second pitch;
ribbonizing the plurality of loose optical fibers into a ribbonized end having the second pitch by placing the plurality of loose optical fibers into a comb structure of a fiber holder;
closing a lid of the fiber holder to clamp the plurality of loose optical fibers into the comb structure;
inserting the ribbonized end into a mass fusion splicer having the second pitch;
cleaving the ribbonized end using the mass fusion splicer; and
splicing the ribbonized end to an end of a second optical fiber ribbon cable using the mass fusion splicer.

9. The method of claim 8, wherein:
the first optical fiber ribbon cable comprises a plurality of 200 micrometer diameter optical fibers, the first pitch is 200 micrometers, and the second pitch is 250 micrometers; and
the second optical fiber ribbon cable has a pitch of 250 micrometers.

10. The method of claim 8, wherein the first optical fiber ribbon cable is a rollable cable having matrix material distributed intermittently along the first optical fiber ribbon cable.

* * * * *